US012461760B2

United States Patent
Bhat et al.

(10) Patent No.: US 12,461,760 B2
(45) Date of Patent: Nov. 4, 2025

(54) MACHINE LEARNING TECHNIQUES FOR ASSESSING INTERFACES

(71) Applicant: Capital One Services, LLC, McLean, VA (US)

(72) Inventors: Atharv Bhat, McLean, VA (US); Zhiyu Lin, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 186 days.

(21) Appl. No.: 18/507,002

(22) Filed: Nov. 10, 2023

(65) Prior Publication Data

US 2025/0156199 A1 May 15, 2025

(51) Int. Cl.
| | |
|---|---|
| *G06F 9/451* | (2018.01) |
| *G06F 3/04847* | (2022.01) |
| *G06F 40/40* | (2020.01) |
| *G06N 20/00* | (2019.01) |
| *G06V 20/50* | (2022.01) |
| *G06V 20/62* | (2022.01) |

(52) U.S. Cl.
CPC .......... *G06F 9/451* (2018.02); *G06F 3/04847* (2013.01); *G06F 40/40* (2020.01); *G06N 20/00* (2019.01); *G06V 20/50* (2022.01); *G06V 20/62* (2022.01)

(58) Field of Classification Search
CPC ...... G06F 9/451; G06F 40/40; G06F 3/04847; G06N 20/00; G06V 20/62; G06V 20/50
See application file for complete search history.

(56) References Cited

U.S. PATENT DOCUMENTS

| | | | | |
|---|---|---|---|---|
| 2024/0005661 | A1* | 1/2024 | Likhomanov | G06V 10/774 |
| 2024/0256948 | A1* | 8/2024 | Betthauser | G06N 20/00 |
| 2024/0304009 | A1* | 9/2024 | Yoon | G06V 20/70 |
| 2024/0330693 | A1* | 10/2024 | Quamar | G06N 3/08 |
| 2024/0354641 | A1* | 10/2024 | Miller | G06N 3/045 |
| 2024/0355010 | A1* | 10/2024 | Ahafonov | G06T 11/001 |
| 2024/0386705 | A1* | 11/2024 | Sullivan | G06V 10/96 |
| 2024/0411968 | A1* | 12/2024 | Sarar | G06F 30/327 |
| 2025/0039037 | A1* | 1/2025 | Memon | H04L 41/0631 |
| 2025/0110461 | A1* | 4/2025 | Javardi | G05B 19/042 |
| 2025/0148353 | A1* | 5/2025 | Kan | G06N 5/022 |

* cited by examiner

*Primary Examiner* — Tadesse Hailu
(74) *Attorney, Agent, or Firm* — Foley & Lardner LLP

(57) ABSTRACT

Methods and systems are described herein for a user interface assessment (UI) system that assesses interfaces using machine learning models. The UI assessment system may receive a request for evaluating a UI comprising (1) a representation of the UI and (2) user-defined target values for parameters. The system may identify elements of the UI and structural properties of each element, each structural property controlling presentation of a corresponding element. The system may generate, for each element, (1) a corresponding composite embedding and (2) a corresponding content embedding. The system may generate a graph representation. The system may then generate a graph embedding using an embedding model. The graph embedding may be input into a parameter analysis machine learning model to obtain a corresponding predicted value for each of the parameters and transmit a corresponding predicted value for each of the parameters.

20 Claims, 8 Drawing Sheets

310

Graph 300

| node 1 | <90, 38, 33, 444, 28> |
| node 2 | <43, -122, 2, 45, 66> |
| node 3 | <333, 5, 5, 33, 2212> |
| node 4 | <3, 77, 44, 234, 234> |
| edge 1,2 | <88px, 33px> |
| edge 2,3 | <22px,-22px> |
| edge 3,4 | <33px, 44px> |
| edge 1,4 | <34px, 55px> |
| edge 1,3 | <33px, 44px> |
| edge 2,4 | <34px, 55px> |

MACHINE LEARNING TECHNIQUES FOR ASSESSING INTERFACES

SUMMARY

Accessibility for varying degrees of disability often requires specific accommodations in order to provide equal access across a population. As technology advances, accessibility in the context of online platforms and digital tools enables disabled individuals and those with differing needs to have access to information and services that are fundamental for day-to-day functionality. In some examples, online platforms and digital tools are the sole method with which those with limited mobility can obtain access to care and information. Similarly, certain services are only provided online, meaning that inaccessibility on those platforms renders the services completely inaccessible for those who require accommodations. For example, telemedicine and remote healthcare are services that are provided via internet-based tools. Similarly, government services and information, online education, digital banking, and financial services are all examples of fundamental services that are provided online.

Without accessible user interfaces (UI) to interface between these services and users with various disabilities, users are unable to fulfill their basic needs, such as getting healthcare, managing their assets, receiving important information from the government and/or the like. In order to mitigate the problem, there exist many different guidelines for making UIs and technology more accessible. For example, the Web Content Accessibility Guidelines (WCAG) are internationally recognized standards for web accessibility. However, while the guidelines provide recommendations and instructions for high-level structures of online platforms, they cannot provide measurements or feedback on smaller scale changes such as positioning of different elements of a UI (e.g., with relation to each other).

The guidelines also fail to address certain aspects of user interface design including visual cues such as icons, optimized typography such as font sizes and line heights and letter spaces, streamlined form fields and visual feedback on actions, and/or the like. This makes it difficult for user interface designers and entities to receive actionable measurements and/or feedback that may be used to update a user interface to improve and widen the population of people who can use the user interface effectively. While manual assessment of a UI can be used, in order to be accessible to many people with different types and varying levels of disability, many testers would have to assess the UI iteratively. Manual assessment of each UI can also be error prone and may struggle to discern patterns over time, especially when analyzing vast amounts of user interface data from users with varying degrees of disability.

Accordingly, a mechanism is desired that would enable assessment of various aspects of user interfaces, e.g., to provide users with actionable feedback or to be used in generating newer, more effective UIs. One mechanism for evaluating interfaces includes usage of machine learning models, which may enable systems to discern patterns over time. For example, machine learning techniques can be used to obtain a predicted value for a plurality of parameters (e.g., analytical parameters) indicating the effectiveness of a UI. The predicted values may be used to assess an interface and/or to provide recommendations for modifications that may make the UI more effective such as by making the UI more accessible. Therefore, methods and systems are described herein for interface assessment using machine learning. A UI assessment system may be used to perform operations described herein.

The UI assessment system may receive a request for evaluating a user interface based on a plurality of parameters. For example, when a user and/or entity wishes to measure an effectiveness of a UI, the user and/or entity may request the UI assessment system to evaluate the user interface, e.g., by predicting values for parameters that may indicate how accessible the UI is, including parameters such as error rates (e.g., how often users of the UI backtrack), completion rates, time on task, how often user use options for resizing text, and/or the like. The request may include a representation of the UI, such as program code for the UI or an image of the UI. The request may also include one or more user-defined target values for the plurality of parameters (e.g., completion rate, time on task). The UI assessment system may identify a plurality of elements of the user interface, such as a text element, a title, etc. Similarly, the UI assessment system may also identify structural properties of each element, such as the font size, color, placement, and/or the like of an element.

The UI assessment system may, for each identified element, generate different embeddings that characterize aspects of the element. For example, the embeddings may include a composite embedding representing corresponding one or more structural properties of each element, such as font size, color, and/or the like. Similarly, the embeddings may include a corresponding content embedding representing content of each element, such as a text embedding of a text box. The embeddings may be used to generate a graph representation that includes nodes and edges. Each node may correspond to an element of the UI and can be assigned one or more values characterizing the element, such as a vector representation. Similarly, each edge can be assigned one or more values representing a relative distance between two elements of the plurality of elements.

The UI assessment system may generate a graph embedding, e.g., using an embedding model trained to transform graph representations into embeddings based on the graph representation of the UI. The graph embedding may then be input into a parameter analysis machine learning model, which is trained to predict values for parameters. The predicted values, e.g., from the parameter analysis machine learning model may be transmitted to a remote device or used for further analysis. In some examples, the predicted values are used alongside generative AI to generate a UI that is more effective or accessible.

In some embodiments, the UI assessment system may use a generative model for UI improvement. For example, the system may input the one or more user-defined target values for the plurality of parameters and data associated with the elements of the UI (e.g., a representation of the UI, the graph embedding or graph representation) into one or more generative models. The generative models may optimize values of the UI, such as structural properties of the elements, the positioning of the elements, and/or the like such that the predicted values of the parameters match the one or more user-defined target values for the parameters.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 illustrates an exemplary data structure of a graph representation of a UI, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
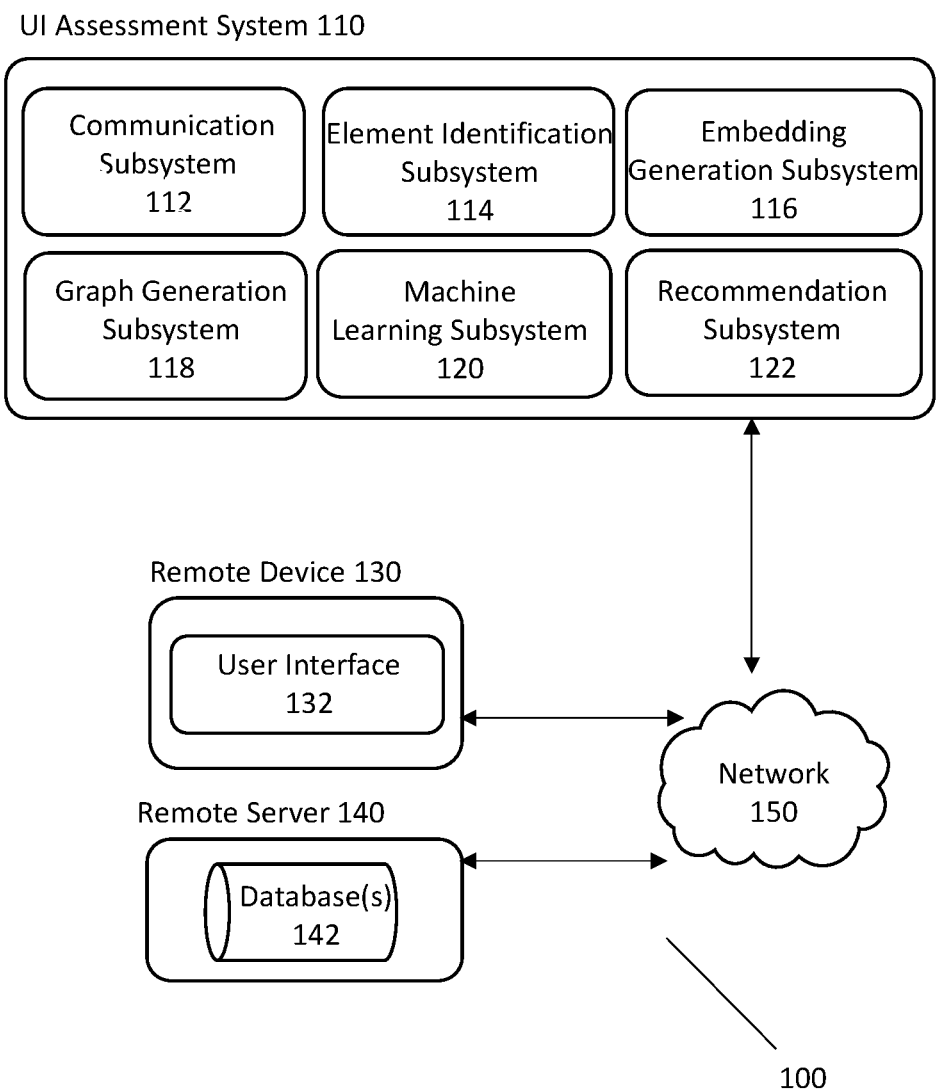
FIG. 1 shows an illustrative system for assessing interfaces based on analytics using machine learning models, in accordance with one or more embodiments of this disclosure.

Environment 100 of FIG. 1 is an example system that may be used to assess interfaces based on analytics using machine learning models. Environment 100 includes UI assessment system 110, remote device 130, and remote server 140. UI assessment system 110 may execute instructions for assessing interfaces based on analytics using machine learning models and obtaining predicted values for parameters that indicate an effectiveness or accessibility of an interface. UI assessment system 110 may include software, hardware, or a combination of the two. For example, UI assessment system 110 may be a physical server or a virtual server that is running on a physical computer system. In some embodiments, UI assessment system 110 may be configured on a user device (e.g., a laptop computer, a smart phone, a desktop computer, an electronic tablet, or another suitable user device).

The UI assessment system may receive a request for evaluating a user interface based on a plurality of parameters. For example, when a user and/or entity wishes to measure an effectiveness of a UI, the user and/or entity may request the UI assessment system to evaluate the user interface, e.g., by predicting values for parameters that may indicate how accessible the UI is including parameters such as error rates (e.g., how often users of the UI backtrack), completion rates, time on task, how often users use options for resizing text, and/or the like.

The request may include a representation of the user interface, such as a file or data structure containing source code for the UI itself, written in languages or frameworks for interface design such as HTML, CSS, JavaScript, and/or XML. The source code may include a portion or all of a computer program that generates the user interface upon execution. Alternatively or additionally, the representation of the UI may include a visual representation, such as a screenshot or a mock-up of the UI that captures a static appearance of the UI, or a video of the UI that captures movement or changes in the UI over time. Intermediary representations such as wireframes or prototypes may also be used. In some cases, the representation of the user interface may include an identifier identifying a location of source code, computer program, screenshot, mock-up, wireframe of the UI, and/or the like.

The request may also include one or more user-defined target values for the plurality of parameters. As described herein, the parameters may indicate how accessible the UI is to users. For example, parameters such as error rates (e.g., how often users of the UI backtrack), completion rates, time on task, how often user use options for resizing text, and/or the like and indicate whether the UI is accessible and/or effective. A user such as a designer or tester for the UI may have target values for each of these parameters. For example, the UI designer may want error rates to be low and completion rates to be high because this may indicate, for example, that users of the UI find the website easy to navigate and are able to effectively complete tasks.

In some embodiments, UI assessment system 110 may receive the request using communication subsystem 112. For example, the UI assessment system 110 may receive the request from a user at a remote device 130 via user interface 132 or from database(s) 142 of remote server 140 via network 150. Network 150 may be a local area network, a wide area network (e.g., the internet), or a combination of the two. Communication subsystem 112 may include software components, hardware components, or a combination of both. For example, communication subsystem 112 may include a network card (e.g., a wireless network card and/or a wired network card) that is associated with software to drive the card. Communication subsystem 112 may pass at least a portion of the data included in the request, or a pointer to the data in memory, to other subsystems such as element identification subsystem 114, embedding generation subsystem 116, graph generation subsystem 118, machine learning subsystem 120 and/or recommendation subsystem 122.

As described, communication subsystem 112 may pass at least a portion of the data of the request, or a pointer to the data in memory, to element identification subsystem 114. The element identification subsystem 114 may be configured to identify a plurality of elements of the user interface from the representation of the UI. The element identification subsystem 114 may also be configured to identify, within the representation, one or more structural properties of each element. As referred to herein, a structural property of an element may control presentation of the element. A structural property can include information about UI elements such as position (e.g., absolute position), size, color, font, and/or the like.

According to some embodiments, the representation may include an image of the user interface. In this case, identifying the plurality of elements of the user interface may include inputting the image into a machine learning model to identify one or more elements and corresponding locations of the one or more elements in the image. In this instance, the machine learning model may have been trained to identify elements in user interfaces (e.g., using a training dataset). For example, the training dataset may contain a plurality of images, each representing a user interface and, for each image, a plurality of elements for that image representation. The training dataset may be input into a training routine of the machine learning model to train that model. When the machine learning model is trained, it may be used to identify elements within images representing user interfaces. The representation of the UI (e.g., computer program, snapshot, wireframe, etc.) may be input into the machine learning model and may identify one or more elements of the UI. For example, the machine learning model may output a set of identified UI elements and corresponding attributes such as element type, position, size, styling, interactivity, and/or the like.

Alternatively or additionally, the representation may include one or more data files including a computer program that generates the user interface upon execution. In this case, identifying the plurality of elements of the user interface may include parsing the computer program to identify one or more elements. For example, parsing may be able to identify different tags from the computer program (e.g., "<p>" in HTML is a paragraph tag that is used to define a paragraph in a web page). For example, the parsing may include several steps such as tokenization (e.g., where the raw computer program text is tokenized into discrete chunks to separate tags from text and other elements), building the document object model (DOM) representing a structure of the program in memory, through one or more parsing libraries or tools and/or the like.

Element identification subsystem 114 may pass at least a portion of the data of the request or a pointer to the data in memory to embedding generation subsystem 116 where aspects of the elements of the UI may be characterized and condensed into an embedding that is representative of features of the element. The embeddings can be more easily compared and processed by other systems and machine learning models. For example, the embeddings may include a composite embedding representing one or more structural properties of each element. As described herein, the structural properties may control presentation of the element and may include information about UI elements such as position (e.g., absolute position), size, color, font, and/or the like. The embeddings may also include a corresponding content embedding representing content of each element. For example, a text embedding of words in the element, or an image embedding representing the image in the element.

For example, the embedding generation subsystem 116 may determine that an element from the representation of the UI includes text (e.g., text boxes, buttons, tabs, menu elements, links, alerts, etc.). Based on determining that a first element of the plurality of elements includes text, the embedding generation subsystem 116 determines structural elements such as a font name, font size, font color, and/or background color associated with the element. The embedding generation subsystem 116 may generate a composite embedding representing the structural properties. For example, embedding generation subsystem 116 may generate a data structure for the element comprising the one or more structural properties, wherein the data structure comprises the font name, the font size, the font color, and the background color.

Alternatively or additionally, the embedding generation subsystem 116 may determine that an element from the representation of the UI includes an image (e.g., icons, image thumbnails, background images, banners and headers, avatars or profile pictures etc.). Based on determining that an element of the plurality of elements includes an image, the embedding generation subsystem 116 determines structural elements such as a size of the image, a color space, a resolution, and an aspect ratio associated with the element. The embedding generation subsystem 116 may generate a composite embedding representing the structural properties. For example, embedding generation subsystem 116 may generate a data structure for the element comprising the one or more structural properties, wherein the data structure comprises the size, the color space, the resolution, and the aspect ratio.

Figure 2:
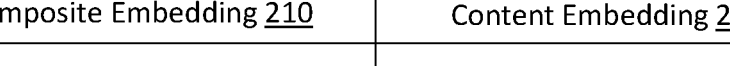
FIG. 2 illustrates an exemplary data structure for embeddings of an element of a user interface (UI), in accordance with one or more embodiments of this disclosure.

FIG. 2 illustrates an exemplary data structure for embeddings of an element of a user interface (UI), in accordance with one or more embodiments of this disclosure. For an element such as an image, the element data structure 200 may include a composite embedding 210 and a content embedding 220. The composite embedding may be a representation of different structural properties. For example, categorical variables or words (e.g., where color is defined as "blue" rather than a value) that define the different structural properties can be converted into continuous vectors (e.g., [0, 0, 255]), making them easier to process using mathematical processes or in machine learning applications. Composite embedding 210 may be represented by a vector 212, and may represent structural properties size, color space, resolution, and/or aspect ratio.

The element data structure 200 also includes a content embedding 220. The content embedding 220 may be a dense vector in a continuous space that captures aspects of the element. In the case of an image element, the embedding may capture patterns or visual details from the image's raw pixel values.

Embedding generation subsystem 116 may pass, for one or more elements of the UI, at least a portion of a data structure including embeddings, or a pointer to the data in memory, to graph generation subsystem 118. The graph generation subsystem 118 may use the embeddings and the elements to generate a graph. For example, graph generation subsystem 118 may generate a graph representation that includes a plurality of nodes and edges. Each node of the graph may represent an element in the UI. Each node may be assigned a vector representation defined by the corresponding composite embedding and the corresponding content embedding for that element (e.g., composite embedding 210 and content embedding 220). Each edge of the graph may be assigned one or more values representing a relative and/or absolute distance between two elements of the plurality of elements. For example, the edge may be a distance between the center of the elements, the distance between a top left corner of each, a top right corner of each, a bottom left corner of each, a bottom right corner of each, and/or a shortest distance between each.

For example, FIG. 3 illustrates an exemplary data structure of a graph representation of a UI, in accordance with one or more embodiments of this disclosure. Graph data structure 300 may include embeddings for each node, such as embedding 320 for node 310. The embedding may be a combined embedding representing the composite embedding and content embedding (e.g., through concatenation) or may include the embeddings separately. The data structure may also include values for each edge (e.g., where each edge is a connection between two nodes). For example, edge 330 may represent the edge between elements 1 and 4 and may have values represented by values 340.

Graph generation subsystem 118 may pass at least a portion of the data of the request or a pointer to the data in memory to machine learning subsystem 120, where machine learning may be used to generate, based on the graph representation, a graph embedding. Machine learning subsystem 120 may also use machine learning to obtain predicted values for each of the plurality of parameters. For example, graph generation subsystem 118 may generate, based on the graph representation (e.g., graph data structure 300), a graph embedding using an embedding model trained to transform graph representations into embeddings. Similarly, graph generation subsystem 118 may input the obtained graph embedding into a parameter analysis machine learning model to obtain a predicted value for each parameter, wherein the parameter analysis machine learning model is trained to predict values for parameters based on graph embeddings. Graph generation subsystem 118 may include many machine learning models, such as a parameter analysis machine learning model and embedding model.

Figure 4:
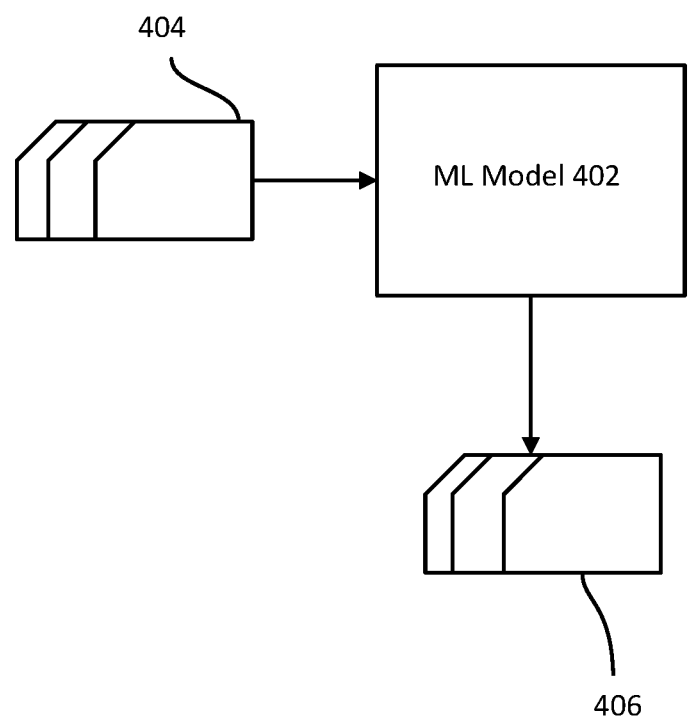
FIG. 4 illustrates an exemplary machine learning model, in accordance with one or more embodiments of this disclosure.

FIG. 4 illustrates an exemplary machine learning model. According to some examples, the machine learning model may be an embedding model configured to convert input data such as words, images, or in this case, a graph representation (e.g., graph data structure 300) into a continuous vector representation that captures the structural properties of the elements, the relative position of the elements, the content of the elements, and/or the like as a graph embedding.

In other examples, the machine learning model may be a parameter analysis machine learning model configured to predict values for each parameter based on the graph embedding (e.g., an embedding of the graph) obtained using the embedding model. For example, the machine learning model may have been trained on a training dataset containing a plurality of different graph representations (e.g., graph data structure 300), each representative of a different user interface. The training dataset may also include, for each interface, a measured (e.g., actually observed) value for each parameter. The training dataset may be input into a training routine of the machine learning model to train that model. When the machine learning model is trained, it may be used to predict values for each parameter. For example, the system may input graph data structure 300 into a machine learning model. The machine learning model may output values predicted for interaction rates, error rates, completion rates, time on task, how often users use options for resizing text, and/or the like. An exemplary machine learning model is described in relation with FIG. 4 herein.

The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model may be self-learning and/or trained rather than explicitly programmed and may perform significantly better in certain areas of problem solving as compared to computer programs that do not use machine learning. During training, an output layer of the machine learning model may correspond to a classification of the machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

In some embodiments, machine learning subsystem 120 may train the machine learning model. Machine learning subsystem 120 may receive a dataset (e.g., from database(s) 142 of remote server 140) that includes a plurality of graph representations associated with different UI. Each graph representation may include, as described, nodes for each element of the UI and edges between different nodes.

As described herein, machine learning subsystem 120 may include an embedding model trained to convert a graph representation (e.g., graph data structure 300) into a continuous vector representation that captures the structural properties of the elements, the relative position of the elements, the content of the elements, and/or the like as a graph embedding. The machine learning subsystem 120 may input the graph embedding into a parameter analysis machine learning model to obtain a corresponding predicted value for each of the plurality of parameters.

Figure 5A:
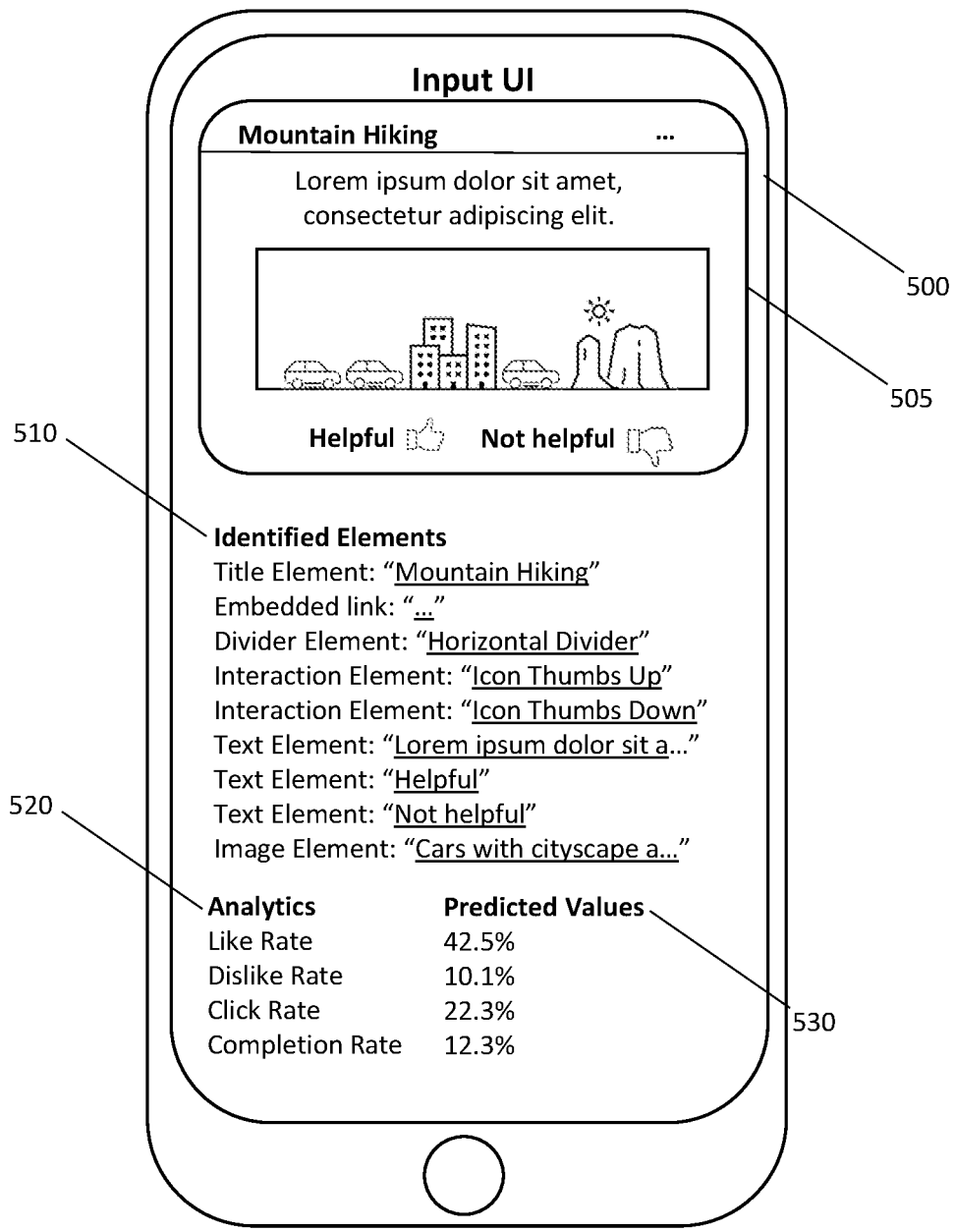
FIG. 5A illustrates a graphical interface for providing a user with predicted values for each of a plurality of parameters, in accordance with one or more embodiments of this disclosure.

Machine learning subsystem 120 may pass at least one of the predicted values of the parameters, or a pointer to the data in memory, to communication subsystem 112. The communication subsystem 112 may be configured to transmit, e.g., to a remote device, a corresponding predicted value for each of the plurality of parameters. The remote device may be configured to display the predicted values for the user. For example, FIG. 5A illustrates a graphical interface 500 for providing a user with predicted values for each of a plurality of parameters, in accordance with one or more embodiments of this disclosure. In the example of FIG. 5A, the representation of user interface 505 may be used to identify elements 510. The identified elements and the representation of the user interface may be used to predict values 530 for parameters (e.g., analytic parameters 520).

In some examples, the machine learning subsystem 120 may also pass at least one of the predicted values of the parameters, or a pointer to the data in memory, to recommendation subsystem 122. The recommendation subsystem 122 may determine whether the corresponding predicted value of each of the plurality of parameters matches the one or more user-defined target values (e.g., exceeds a minimum threshold or does not exceed a maximum threshold). In response to determining that at least one of the predicted values does not match the one or more user-defined target values for the parameters, the recommendation subsystem 122 may generate one or more recommendations for modifying elements of the user interface. For example, if a button is not being interacted with, the recommendation subsystem 122 may recommend to a user (e.g., designer) to change the contrast of the text in the button with a background color, e.g., so as to make the button more visible. Alternatively, the recommendation subsystem 122 may recommend changing the size of the font of the button.

Figure 5B:
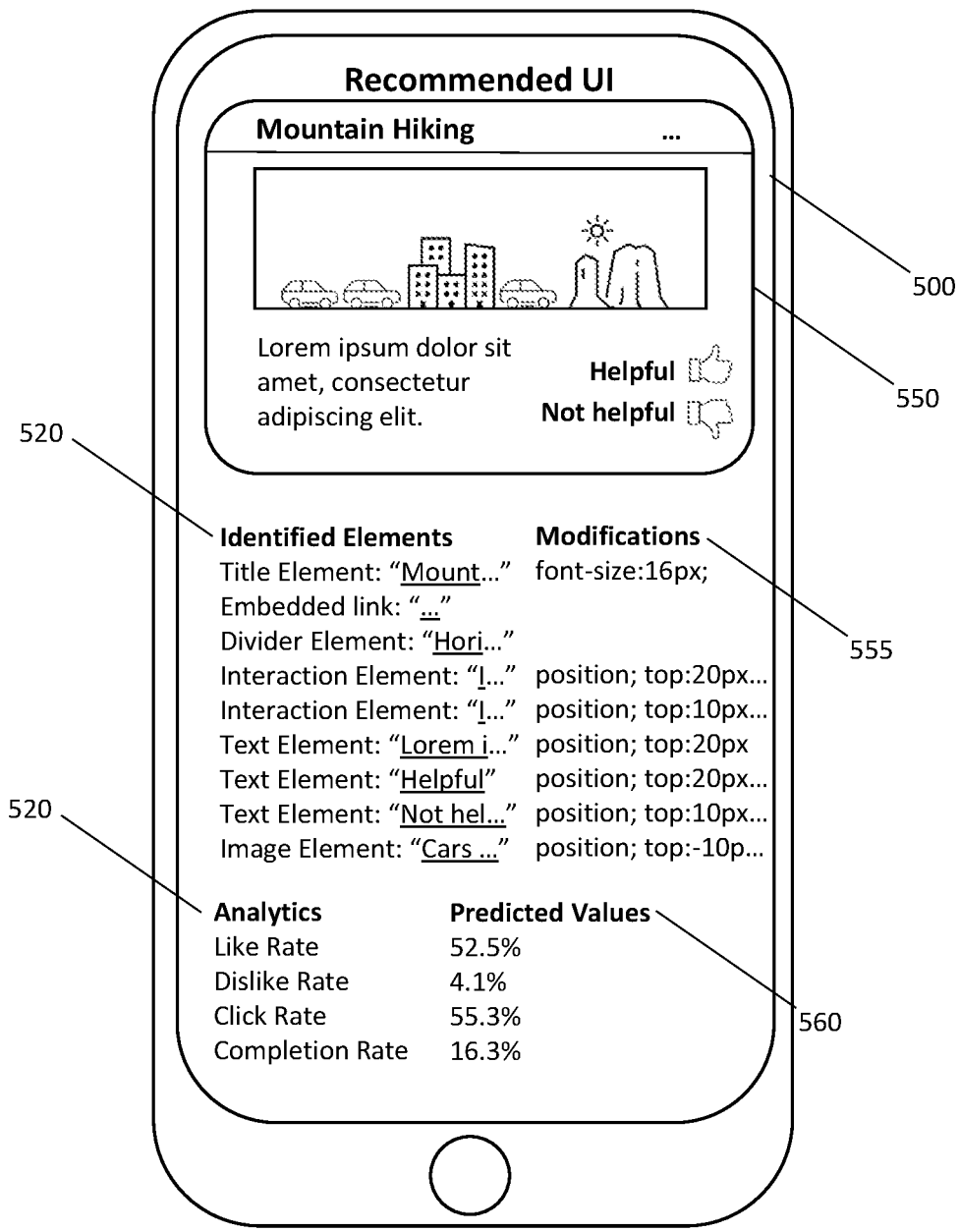
FIG. 5B illustrates a graphical interface for providing a user with a recommended UI, in accordance with one or more embodiments of this disclosure.

For example, FIG. 5B illustrates a graphical interface for providing a user with a recommended user interface (UI), in accordance with one or more embodiments of this disclosure. In the example of FIG. 5B, the recommendation subsystem 122 may be used to generate a modified representation of user interface 550. For each of the identified elements, the recommendation subsystem 122 may recommend modifications 555. The graphical interface 500 may also identify the predicted values 560 for each parameter (e.g., analytic parameters 520) for the modified representation of the user interface 550.

Alternatively or additionally, in response to determining that the corresponding predicted value of each of the plurality of parameters matches the one or more user-defined target values for the parameters, the UI assessment system may generate a command for deploying the user interface. The system may receive, e.g., from the remote device, a measured value (e.g., actually observed value) for each of the plurality of parameters which may be used to update the parameter analysis machine.

In some embodiments, responsive to determining that one or more predicted values corresponding to one or more parameters of the plurality of parameters do not match the one or more user-defined target values, the UI assessment system may use a generative machine learning model (e.g., of machine learning subsystem 120) to sequentially generate a modified representation of the user interface until the corresponding predicted value of each of the plurality of parameters matches the one or more user-defined target values. The machine learning subsystem 120 may extract one or more first structural properties associated with an element of the plurality of elements and may generate a prompt for the generative model to vary the one or more first structural properties. The system may input the prompt into the generative model. For example, if the element is determined to be a text element, the text may be extracted from the element, and the prompt may include a prompt to vary the text of the first element. In some examples, the system may retrieve a plurality of distances corresponding to the plurality of edges and generate a prompt for the generative model to vary the plurality of distances.

A generative model may include a deep learning-based UI generation, reinforcement learning (RL) optimization, and/or may integrate user feedback. For example, the generative model may use a neural network, e.g., based on transformer architectures, trained on datasets of existing UI designs, modified UI designs and associated metrics (e.g., a first UI design and a related clickthrough rate and a second UI design with a modification and a second related clickthrough rate). The model may take the graph representation and/or graph embedding and the predicted value(s) as input and may output preliminary UI mockups as image-based representations or deployment formats such as HTML/CSS. The generative model may also employ a reinforcement learning agent to facilitate iterative refinement, e.g., by testing different UI designs and determining optimal UIs (e.g., to maximize or minimize certain parameters). The reinforcement learning agent may modify its policies in favor of higher-performing UI elements. The generative model may also integrate user feedback post-deployment of the generated UI.

According to some examples, the system may input the graph data (e.g., the graph representation, representation of the UI, etc.) to one or more graph explainability tools that may be used to understand node level importance, e.g., using predicted values. For example, because graph-based models can have complex relationships between nodes and edges, explainability can highlight influential nodes or paths. These tools can be used to explain which nodes or UI elements are important for customers. This can be used by users (e.g., via the user interface of remote device 130) to help users understand what changes cause different predicted values. The graph structure (e.g., nodes, and edges), node and edge attributes, model predictions and decisions, target nodes and edges, and/or graph-base model parameters may be input into one or more graph explainability tools and as an output, the system may obtain an important subgraph (e.g., subgraph or subset of graph having the most influence on a particular decision or prediction), feature importance, explanation scores, etc.

Computing Environment

Figure 6:
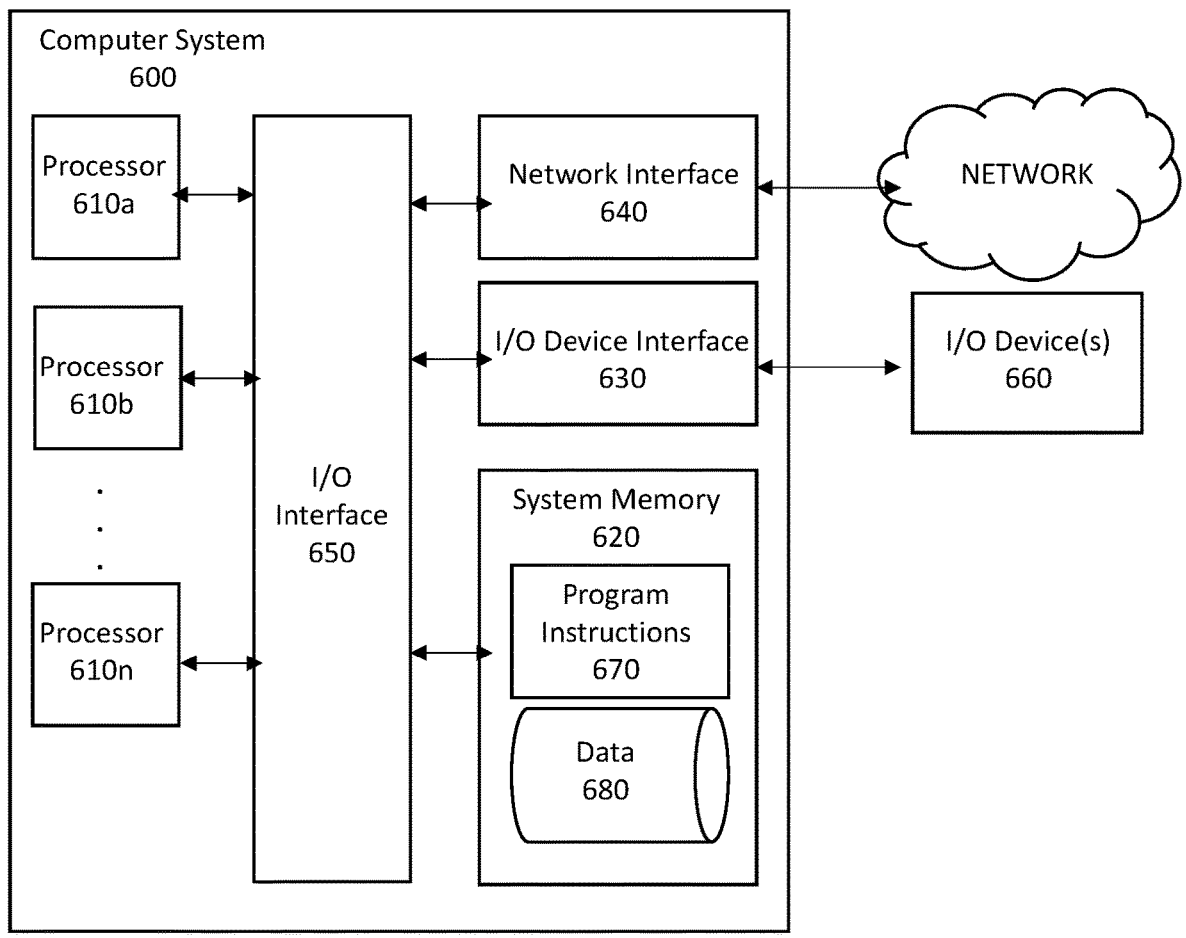
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
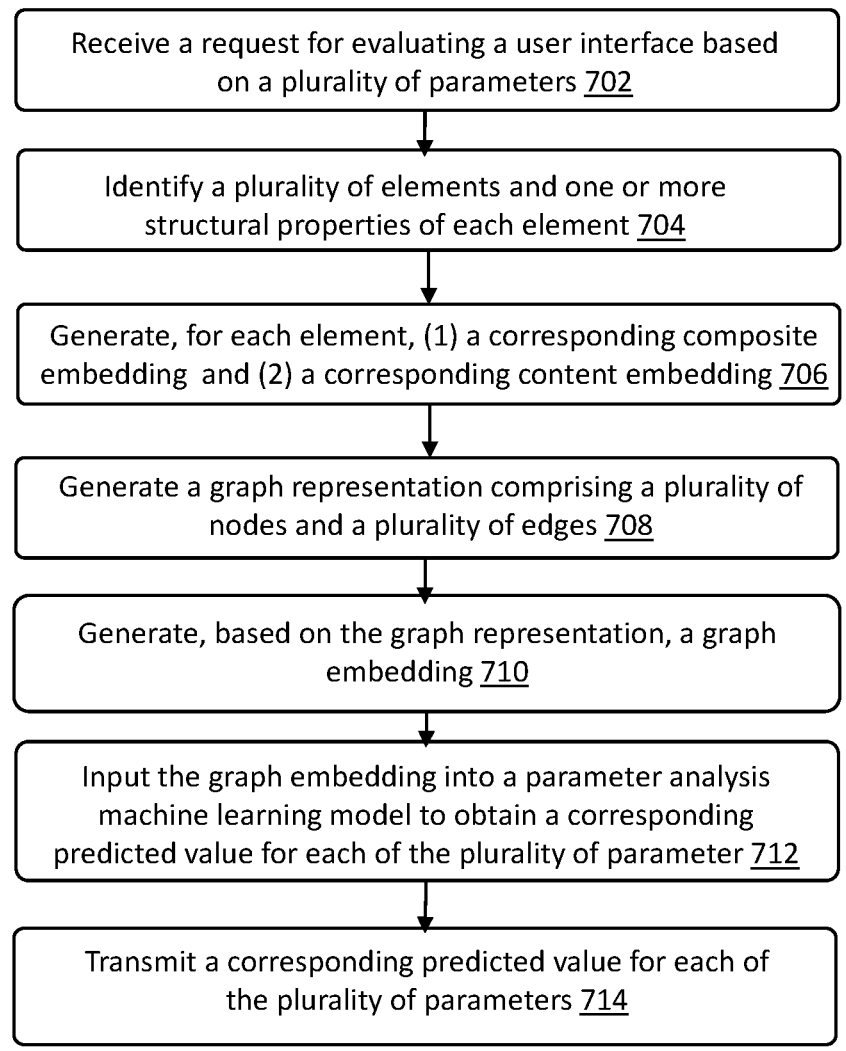
FIG. 7 is a flowchart of operations for assessing interfaces based on analytics using machine learning models, in accordance with one or more embodiments of this disclosure.

FIG. 7 is a flowchart 700 of operations for assessing interfaces based on analytics using machine learning models, in accordance with one or more embodiments of this disclosure. The operations of FIG. 7 may use components described in relation to FIG. 6. In some embodiments, UI assessment system 110 may include one or more components of computer system 600. At 702, UI assessment system 110 receives a request for evaluating a user interface based on a plurality of parameters. UI assessment system 110 may receive the request over network 150 using network interface 640. For example, the UI assessment system may receive a request for evaluating a user interface based on a plurality of parameters, e.g., when a user and/or entity wishes to measure an effectiveness of a UI. The request may include a representation of the user interface, such as a file or data structure containing source code for the UI itself or may include a visual representation that captures a static or dynamic appearance of the UI over time.

At 704, UI assessment system 110 identifies a plurality of elements and one or more structural properties of each element. UI assessment system 110 may use one or more processors 610a, 610b, and/or 610n to perform the identification. According to some embodiments, the representation may include an image of the user interface. In this case, identifying the plurality of elements of the user interface may include inputting the image into a machine learning model to identify one or more elements and corresponding locations of the one or more elements in the image. In this instance, the machine learning model may have been trained to identify elements in user interfaces (e.g., using a training dataset). Alternatively or additionally, the representation may include a computer program that generates the user interface upon execution. In this case, identifying the plurality of elements of the user interface may include inputting text of the computer program into a machine learning model to identify one or more elements.

At 706, UI assessment system 110 generates, for each element, (1) a corresponding composite embedding and (2) a corresponding content embedding. Aspects of the elements of the UI may be characterized and condensed into embeddings representative of features of the element. A composite embedding may represent one or more structural properties that control presentation of the element. A content embedding may represent content of each element. A content embedding may be, for example, a text embedding of words in the element, or an image embedding representing the image in the element.

The system may generate a graph representation comprising a plurality of nodes and a plurality of edges at 708, e.g., using the embeddings. For example, UI assessment system 110 may use one or more processors 610a-610n to perform the operations and may store the results in system memory 620. A graph representation may include a plurality of nodes and edges. Each node of the graph may represent an element in the UI. Each node may be assigned a vector representation defined by the corresponding composite embedding and the corresponding content embedding. Each edge of the graph may be assigned one or more values representing a relative and/or absolute distance between two elements of the plurality of elements.

At 710, the UI assessment system generates, based on the graph representation, a graph embedding and at 712 inputs the graph embedding into a parameter analysis machine learning model to obtain a corresponding predicted value for each of the plurality of parameters. At 710, the system transmits a corresponding predicted value for each of the plurality of parameters, e.g., to a remote device over network 150 using network interface 640. For example, the graph representation may be input into a machine learning model (e.g., machine learning subsystem 120), where machine learning may be used to generate, based on the graph representation, a graph embedding. The system may generate, based on the graph representation (e.g., graph data structure 300), a graph embedding using an embedding model trained to transform graph representations into embeddings. Similarly, graph generation subsystem 118 may input the obtained graph embedding into a parameter analysis machine learning model to obtain a predicted value for each parameter, wherein the parameter analysis machine learning model is trained to predict values for parameters based on graph embeddings.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for assessing interfaces based on analytics using machine learning models, the method comprising: receiving a request for evaluating a user interface based on a plurality of parameters, wherein the request comprises (1) a representation of the user interface and (2) one or more user-defined target values for the plurality of parameters; identifying, within the representation, a plurality of elements of the user interface and one or more structural properties of each element, wherein each structural property controls presentation of a corresponding element; generating, for each element, (1) a corresponding composite embedding representing corresponding one or more structural properties of each element and (2) a corresponding content embedding representing content of each element; generating a graph representation comprising a plurality of nodes and a plurality of edges, wherein each node corresponds to an element of the plurality of elements, wherein each node is assigned a vector representation defined by the corresponding composite embedding and the corresponding content embedding for that element, and wherein each edge comprises one or more values representing a relative distance between two elements of the plurality of elements; generating, based on the graph representation, a graph embedding using an embedding model trained to transform graph representations into embeddings; inputting the graph embedding into a parameter analysis machine learning model to obtain a corresponding predicted value for each of the plurality of parameters, wherein the parameter analysis machine learning model is trained to predict values for parameters based on graph embeddings; and transmitting, to a remote device, a corresponding predicted value for each of the plurality of parameters.

2. Any of the preceding embodiments, further comprising: determining whether the corresponding predicted value of each of the plurality of parameters matches the one or more user-defined target values; and in response to determining that the corresponding predicted value of one or more of the plurality of parameters does not match the one or more user-defined target values for the parameters, generating one or more recommendations for modifying elements of the user interface.

3. Any of the preceding embodiments, further comprising, responsive to determining that one or more predicted values corresponding to one or more parameters of the plurality of parameters do not match the one or more user-defined target values, generating sequentially, using a generative model, a modified representation of the user interface until the corresponding predicted value of each of the plurality of parameters matches the one or more user-defined target values.

4. Any of the preceding embodiments, further comprising: extracting one or more first structural properties associated with a first element of the plurality of elements; generating a prompt for the generative model to vary the one or more first structural properties; and inputting the prompt into the generative model.

5. Any of the preceding embodiments, further comprising: determining that a first element of the plurality of elements is a textual element; extracting text from the first element; generating a prompt for the generative model to vary the text of the first element; and inputting the prompt into the generative model.

6. Any of the proceeding embodiments, further comprising: retrieving a plurality of distances corresponding to the plurality of edges; generating a prompt for the generative model to vary the plurality of distances; and inputting the prompt into the generative model.

7. Any of the preceding embodiments, further comprising: in response to determining that the corresponding predicted value of each of the plurality of parameters matches the one or more user-defined target values for the parameters, generating a command for deploying the user interface; receiving, from the remote device, a corresponding measured value for each of the plurality of parameters; and updating the parameter analysis machine learning model using the corresponding measured value for each of the plurality of parameters.

8. Any of the preceding embodiments, wherein the representation comprises an image of the user interface, and wherein identifying the plurality of elements of the user interface comprises: inputting the image into a machine learning model to identify one or more elements and corresponding locations of the one or more elements in the image, wherein the machine learning model has been trained to identify elements in user interfaces.

9. Any of the preceding embodiments, wherein the representation comprises one or more data files comprising a computer program configured to generate the user interface upon execution, and wherein identifying the plurality of elements of the user interface comprises inputting text of the computer program into a third machine learning model to identify one or more elements.

10. Any of the preceding embodiments, further comprising: determining that a first elements of the plurality of elements comprises text; based on determining that a first element of the plurality of elements comprises text, determining a font name associated with the first element, a font size associated with the first element, a font color associated with the first element, and a background color associated with the first element; and generating a data structure for the first element comprising the one or more structural properties, wherein the data structure comprises the font name, the font size, the font color, and the background color.

11. Any of the preceding embodiments, further comprising: determining that a first element of the plurality of elements comprises an image; based on determining that the first element of the plurality of elements comprises the image, determining a size associated with the first element, a color space associated with the first element, a resolution associated with the first element, and an aspect ratio associated with the first element; and generating a data structure for the first element comprising the one or more structural properties, wherein the data structure comprises the size, the color space, the resolution, and the aspect ratio.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

15. A system comprising cloud-based circuitry for performing any of embodiments 1-11.

What is claimed is:

1. A system for assessing interfaces using machine learning models, the system comprising:
one or more processors; and
a non-transitory, computer-readable medium comprising instructions that, when executed by the one or more processors, causes operations comprising:
receiving a request for evaluating a user interface based on a plurality of parameters, wherein the request comprises (1) a representation of the user interface and (2) one or more user-defined target values for the plurality of parameters;
identifying, within the representation, a plurality of elements of the user interface and one or more structural properties of each element, wherein each structural property controls presentation of a corresponding element;
generating, for each element, (1) a corresponding composite embedding representing corresponding one or more structural properties of each element and (2) a corresponding content embedding representing content of each element;
generating a graph representation comprising a plurality of nodes and a plurality of edges, wherein each node corresponds to an element of the plurality of elements, wherein each node is assigned a vector representation defined by the corresponding composite embedding and the corresponding content embedding for that element, and wherein each edge comprises one or more values representing a relative distance between two elements of the plurality of elements;

generating, based on the graph representation, a graph embedding using an embedding model trained to transform graph representations into embeddings;

inputting the graph embedding into a parameter analysis machine learning model to obtain a corresponding predicted value for each of the plurality of parameters, wherein the parameter analysis machine learning model is trained to predict values for parameters based on graph embeddings; and responsive to determining that the corresponding predicted value for one or more of the plurality of parameters do not match the one or more user-defined target values, generating sequentially, using a generative model, modified representations of the user interface until each corresponding predicted value of each of the plurality of parameters matches the one or more user-defined target values.

2. A method for assessing interfaces based on analytics using machine learning models, the method comprising:

receiving a request for evaluating a user interface based on a plurality of parameters, wherein the request comprises (1) a representation of the user interface and (2) one or more user-defined target values for the plurality of parameters;

identifying, within the representation, a plurality of elements of the user interface and one or more structural properties of each element, wherein each structural property controls presentation of a corresponding element;

generating, for each element, (1) a corresponding composite embedding representing corresponding one or more structural properties of each element and (2) a corresponding content embedding representing content of each element;

generating a graph representation comprising a plurality of nodes and a plurality of edges, wherein each node corresponds to an element of the plurality of elements, wherein each node is assigned a vector representation defined by the corresponding composite embedding and the corresponding content embedding for that element, and wherein each edge comprises one or more values representing a relative distance between two elements of the plurality of elements;

generating, based on the graph representation, a graph embedding using an embedding model trained to transform graph representations into embeddings;

inputting the graph embedding into a parameter analysis machine learning model to obtain a corresponding predicted value for each of the plurality of parameters, wherein the parameter analysis machine learning model is trained to predict values for parameters based on graph embeddings; and transmitting, to a remote device, a corresponding predicted value for each of the plurality of parameters.

3. The method of claim 2, further comprising:

determining whether the corresponding predicted value of each of the plurality of parameters matches the one or more user-defined target values; and in response to determining that the corresponding predicted value of one or more of the plurality of parameters does not match the one or more user-defined target values for the parameters, generating one or more recommendations for modifying elements of the user interface.

4. The method of claim 2, further comprising, responsive to determining that one or more predicted values corresponding to one or more parameters of the plurality of parameters do not match the one or more user-defined target values, generating sequentially, using a generative model, a modified representation of the user interface until the corresponding predicted value of each of the plurality of parameters matches the one or more user-defined target values.

5. The method of claim 4, further comprising:

extracting one or more first structural properties associated with a first element of the plurality of elements;

generating a prompt for the generative model to vary the one or more first structural properties; and inputting the prompt into the generative model.

6. The method of claim 4, further comprising:

determining that a first element of the plurality of elements is a textual element;

extracting text from the first element;

generating a prompt for the generative model to vary the text of the first element; and inputting the prompt into the generative model.

7. The method of claim 4, further comprising:

retrieving a plurality of distances corresponding to the plurality of edges;

generating a prompt for the generative model to vary the plurality of distances; and inputting the prompt into the generative model.

8. The method of claim 2, further comprising:

in response to determining that the corresponding predicted value of each of the plurality of parameters matches the one or more user-defined target values for the parameters, generating a command for deploying the user interface;

receiving, from the remote device, a corresponding measured value for each of the plurality of parameters; and updating the parameter analysis machine learning model using the corresponding measured value for each of the plurality of parameters.

9. The method of claim 2, wherein the representation comprises an image of the user interface, and wherein identifying the plurality of elements of the user interface comprises:

inputting the image into a machine learning model to identify one or more elements and corresponding locations of the one or more elements in the image, wherein the machine learning model has been trained to identify elements in user interfaces.

10. The method of claim 2, wherein the representation comprises one or more data files comprising a computer program configured to generate the user interface upon execution, and wherein identifying the plurality of elements of the user interface comprises inputting text of the computer program into a third machine learning model to identify one or more elements.

11. The method of claim 2, further comprising:

determining that a first elements of the plurality of elements comprises text;

based on determining that a first element of the plurality of elements comprises text, determining a font name associated with the first element, a font size associated with the first element, a font color associated with the first element, and a background color associated with the first element; and generating a data structure for the first element comprising the one or more structural properties, wherein the data structure comprises the font name, the font size, the font color, and the background color.

12. The method of claim 2, further comprising:
determining that a first element of the plurality of elements comprises an image;
based on determining that the first element of the plurality of elements comprises the image, determining a size associated with the first element, a color space associated with the first element, a resolution associated with the first element, and an aspect ratio associated with the first element; and
generating a data structure for the first element comprising the one or more structural properties, wherein the data structure comprises the size, the color space, the resolution, and the aspect ratio.

13. One or more non-transitory, computer-readable media comprising instructions recorded thereon that, when executed by one or more processors, cause operations for assessing interfaces using machine learning models, comprising:
receiving a request for evaluating a user interface based on a plurality of parameters, wherein the request comprises (1) a representation of the user interface and (2) one or more user-defined target values for the plurality of parameters;
identifying, within the representation, a plurality of elements of the user interface and one or more structural properties of each element, wherein each structural property controls presentation of a corresponding element;
generating, for each element, (1) a corresponding composite embedding representing corresponding one or more structural properties of each element and (2) a corresponding content embedding representing content of each element;
generating a graph representation comprising a plurality of nodes and a plurality of edges, wherein each node corresponds to an element of the plurality of elements, wherein each node is assigned a vector representation defined by the corresponding composite embedding and the corresponding content embedding for that element, and wherein each edge comprises one or more values representing a relative distance between two elements of the plurality of elements;
generating, based on the graph representation, a graph embedding using an embedding model trained to transform graph representations into embeddings; and
inputting the graph embedding into a parameter analysis machine learning model to obtain a corresponding predicted value for each of the plurality of parameters, wherein the parameter analysis machine learning model is trained to predict values for parameters based on graph embeddings.

14. The one or more non-transitory, computer-readable media of claim 13, wherein the instructions further cause operations comprising:
determining whether the corresponding predicted value of each of the plurality of parameters matches the one or more user-defined target values; and
in response to determining that the corresponding predicted value of one or more of the plurality of parameters does not match the one or more user-defined target values for the parameters, generating one or more recommendations for modifying elements of the user interface.

15. The one or more non-transitory, computer-readable media of claim 13, wherein the instructions further cause operations comprising, responsive to determining that one or more predicted values corresponding to one or more parameters of the plurality of parameters do not match the one or more user-defined target values, generating sequentially, using a generative model, a modified representation of the user interface until the corresponding predicted value of each of the plurality of parameters matches the one or more user-defined target values.

16. The one or more non-transitory, computer-readable media of claim 15, wherein the instructions further cause operations comprising:
extracting one or more first structural properties associated with a first element of the plurality of elements;
generating a prompt for the generative model to vary the one or more first structural properties; and
inputting the prompt into the generative model.

17. The one or more non-transitory, computer-readable media of claim 15, wherein the instructions further cause operations comprising:
determining that a first element of the plurality of elements is a textual element;
extracting text from the first element;
generating a prompt for the generative model to vary the text of the first element; and
inputting the prompt into the generative model.

18. The one or more non-transitory, computer-readable media of claim 15, wherein the instructions further cause operations comprising:
retrieving a plurality of distances corresponding to the plurality of edges;
generating a prompt for the generative model to vary the plurality of distances; and
inputting the prompt into the generative model.

19. The one or more non-transitory, computer-readable media of claim 13, wherein the instructions further cause operations comprising:
in response to determining that the corresponding predicted value of each of the plurality of parameters matches the one or more user-defined target values for the parameters, generating a command for deploying the user interface;
receiving, from a remote device, a corresponding measured value for each of the plurality of parameters; and
updating the parameter analysis machine learning model using the corresponding measured value for each of the plurality of parameters.

20. The one or more non-transitory, computer-readable media of claim 13, wherein the representation comprises an image of the user interface, and wherein identifying the plurality of elements of the user interface comprises:
inputting the image into a machine learning model to identify one or more elements and corresponding locations of the one or more elements in the image, wherein the machine learning model has been trained to identify elements in user interfaces.

* * * * *